United States Patent [19]
Leblanc

[11] Patent Number: 5,090,939
[45] Date of Patent: * Feb. 25, 1992

[54] APPARATUS FOR TRIMMING BACK FAT OFF A PORK LOIN

[75] Inventor: Georges-Emile Leblanc, St-Anselme, Canada

[73] Assignee: G. E. Leblanc Inc., St. Anselme, Canada

[*] Notice: The portion of the term of this patent subsequent to Nov. 20, 2007 has been disclaimed.

[21] Appl. No.: 624,318

[22] Filed: Dec. 4, 1990

[30] Foreign Application Priority Data

Mar. 16, 1990 [CA] Canada .................................. 2012356

[51] Int. Cl.⁵ ............................................ A23C 15/00
[52] U.S. Cl. .................................. 452/127; 452/134; 452/177
[58] Field of Search ............... 452/127, 125, 128, 129, 452/130, 134, 177, 171, 170, 169, 165

[56] References Cited

U.S. PATENT DOCUMENTS

| 3,197,808 | 8/1965 | Mears | 17/1 |
| 3,546,737 | 12/1970 | Neebel et al. | 17/1 |
| 3,685,095 | 8/1972 | Metro | 17/1 |
| 3,771,196 | 11/1973 | Doerfer et al. | 17/1 |
| 4,009,652 | 3/1977 | Anderson | 99/590 |
| 4,189,806 | 2/1980 | Van Heyningen | 452/134 |
| 4,557,014 | 12/1985 | Vogt | 17/1 |
| 4,970,755 | 11/1990 | Leblanc | 452/134 |

FOREIGN PATENT DOCUMENTS 1079114 6/1980 Canada .

Primary Examiner—Bruce M. Kisliuk
Assistant Examiner—Lawrence Cruz
Attorney, Agent, or Firm—Darby & Darby

[57] ABSTRACT

An apparatus for trimming back fat off a pork loin comprises (a) a flat and arcuate cutting blade, (b) a conveyor formed of an endless belt arcuate in cross section and having a smooth top surface, and (c) a pair of endless chains provided with teeth. In operation, the loin is conveyed toward the blade between the endless chains and the top surface of the conveyor. During its transport toward the blade the pork loin is pressed between the two chains and the conveyor with the teeth of the chains penetrating the meat. The conveyor and the chains are driven at different linear speeds to produce in the pressed loin a compression and tension distribution which facilitates passage of the meat through the cutting blade and improves trimming of the back fat. As the top surface of the conveyor is smooth, it allows the conveyed loin to slide laterally toward the center of the conveyor. The loin is thereby centered before it reaches the blade.

16 Claims, 4 Drawing Sheets

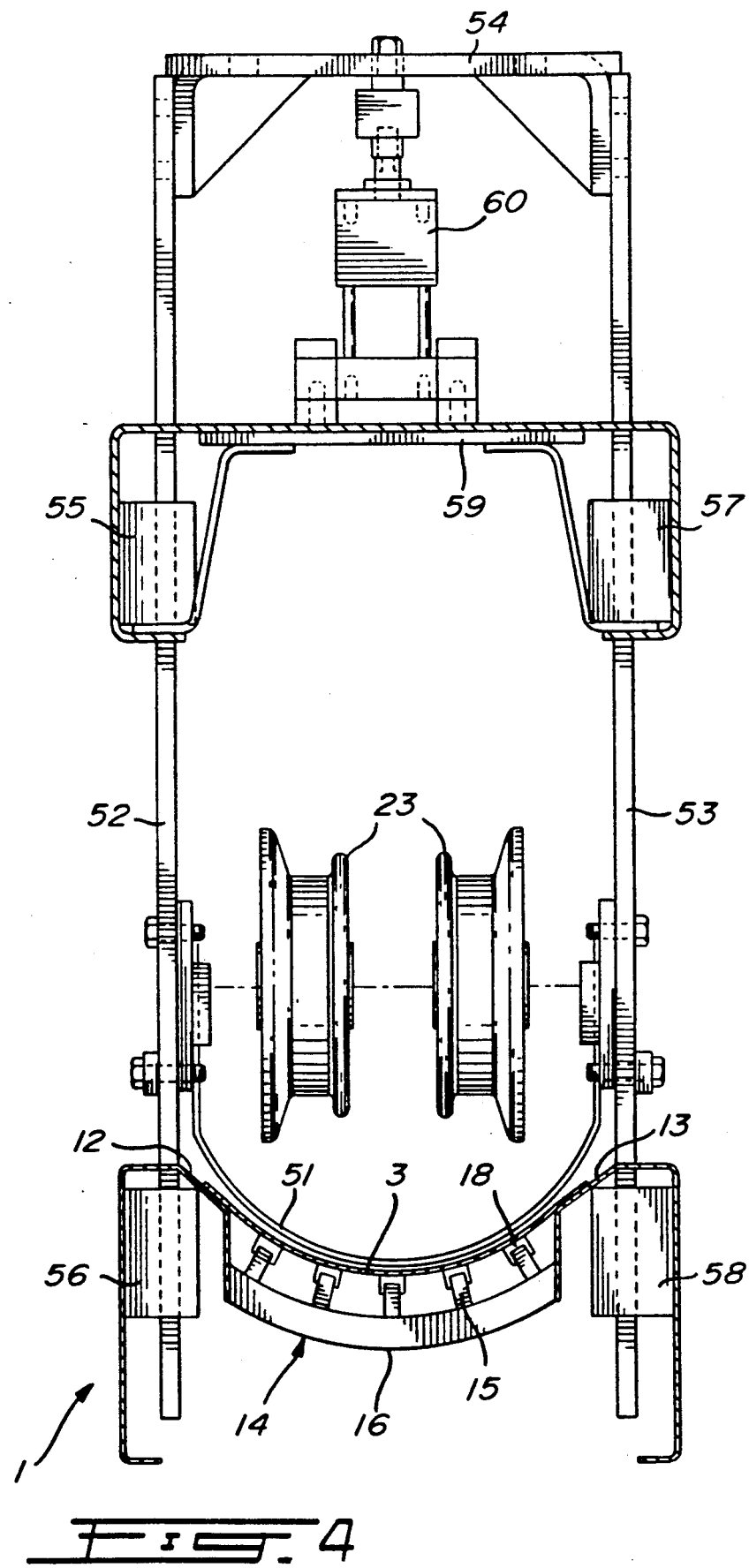

APPARATUS FOR TRIMMING BACK FAT OFF A PORK LOIN

BACKGROUND OF THE INVENTION

1. Field of the Invention

The present invention relates to an apparatus for trimming an outer layer of fat off a piece of meat, in particular but not exclusively the back fat of a pork loin. The loin is conveyed between the top surface of a conveyor and a set of endless chains, and is passed through a blade to trim off the fat.

2. Brief Description of the Prior Art

Canadian patent No. 1,079,114 (Van Heyningen) issued on June 10, 1980, describes an apparatus of the above type for trimming the back fat from pork loins. The apparatus of Van Heyningen comprises (a) a conveyor with a top surface formed of a plurality of arcuate slats, (b) a pair of endless chains above the conveyor, and (c) an arcuate knife blade separated from the top surface of the conveyor by a distance which is adjustable in function of the thickness of the back fat. The chains and the slats are respectively provided with teeth and points capable to penetrate the loin.

In operation, the pork loin is placed on the upstream end of the conveyor centrally of the arcuate slats, and the conveyor and the endless chains are driven in the same direction at substantially the same linear speed. As the loin is conveyed toward the knife blade, the teeth of the chains and the points of the conveyor penetrate the meat to force it across the blade and thereby separate the fat and lean portions.

A first drawback of the apparatus of Van Heyningen is that the conveyor and the chains are operating at the same linear speed An adequate compression and tension distribution in the loin to facilitate passage thereof across the blade is accordingly not produced.

Another drawback of the apparatus of Canadian patent No. 1,079,114 is that the loin must be placed initially centrally of the conveyor; the apparatus cannot automatically adjust the lateral position of the pork loin as the penetrating teeth and points maintain it in its initial position.

In this prior art apparatus, the knife blade cannot be lowered very close to the top surface of the conveyor to trim off very thin layers of back fat. Indeed, the minimum distance between the knife blade and the conveyor is determined by the height of the points penetrating the loin. Therefore, the apparatus of Van Heyningen further presents the disadvantage of causing a loss of meat when the layer of fat is thin.

OBJECTS OF THE INVENTION

The main object of the present invention is therefore to eliminate the above discussed drawbacks of the apparatus of Canadian patent No. 1,079,114.

Another object of the present invention is to provide a trimming apparatus of which the conveyor and endless chains are driven at different linear speeds to produce in the meat a compression and tension distribution which facilitates passage of the piece of meat through the blade and thereby improves trimming of the fat.

A further object of the invention is a trimming apparatus with a conveyor having a top surface which is smooth and arcuate in cross section; as the top surface of the conveyor is smooth it allows (a) the piece of meat to slide laterally whereby it is automatically centered on the conveyor before reaching the blade and (b) the arcuate blade to be lowered very close to the top surface of the conveyor to trim off very thin layers of fat without loss of meat.

SUMMARY OF THE INVENTION

More particularly, in accordance with the subject invention, there is provided an apparatus for trimming an outer layer of fat off a piece of meat, comprising:

a frame;

conveyor means mounted on the frame and defining a top surface for conveying the piece of meat;

endless chain means also mounted on the frame above the conveyor means, which endless chain means extending generally parallel to the conveyor means;

a cutting blade attached to the frame and positioned between the conveyor and chain means;

means for driving the conveyor means and the chain means at different linear speeds for conveying the piece of meat toward the cutting blade and pass this piece of meat through the blade to thereby trim off the fat; and means for pressing the piece of meat between the chain means and the top surface of the conveyor means as the meat is conveyed toward the cutting blade and passes through this blade.

In operation, the different linear speeds of the conveyor and chain means produce in the pressed piece of meat a compression and tension distribution which facilitates passage of the meat through the cutting blade to thereby improve trimming of the layer of fat.

In accordance with a preferred embodiment of the trimming apparatus of the invention, the linear speed of the conveyor means is slightly higher than that of the endless chain means, the top surface of the conveyor means is a smooth surface, and the chain means comprises teeth penetrating the piece of meat of which the layer of fat is to be trimmed off. Advantageously, the ratio of the linear speed of the chain means to the linear speed of the conveyor means is of about 0.84.

In accordance with another preferred embodiment of the trimming apparatus of the invention, the top surface of the conveyor means is arcuate in cross section and, as it is smooth, it allows the conveyed piece of meat to slide laterally on this top surface toward the center of the conveyor means whereby the piece of meat is adequately positioned when it passes through the cutting blade. To that effect, the conveyor means comprises an endless belt of flexible material sliding onto belt support means capable to curve the flexible material and thereby make the endless belt arcuate in cross section.

In accordance with a further preferred embodiment of the trimming apparatus of the invention, the cutting blade can be raised and lowered in function of the thickness of the layer of fat and, as the top surface of the conveyor is smooth, it allows the blade to be lowered very close to this top surface to trim off very thin layers of fat without loss of meat.

The objects, advantages and other features of the present invention will become more apparent upon reading of the following non restrictive description of a preferred embodiment thereof, given by way of example only with reference to the accompanying drawings.

BRIEF DESCRIPTION OF THE DRAWINGS

In the appended drawings:

FIG. 4 is also a cross sectional view of the apparatus of the subject invention taken along axis B—B of FIG. 1.

DETAILED DESCRIPTION OF THE PREFERRED EMBODIMENT

Figure 1:
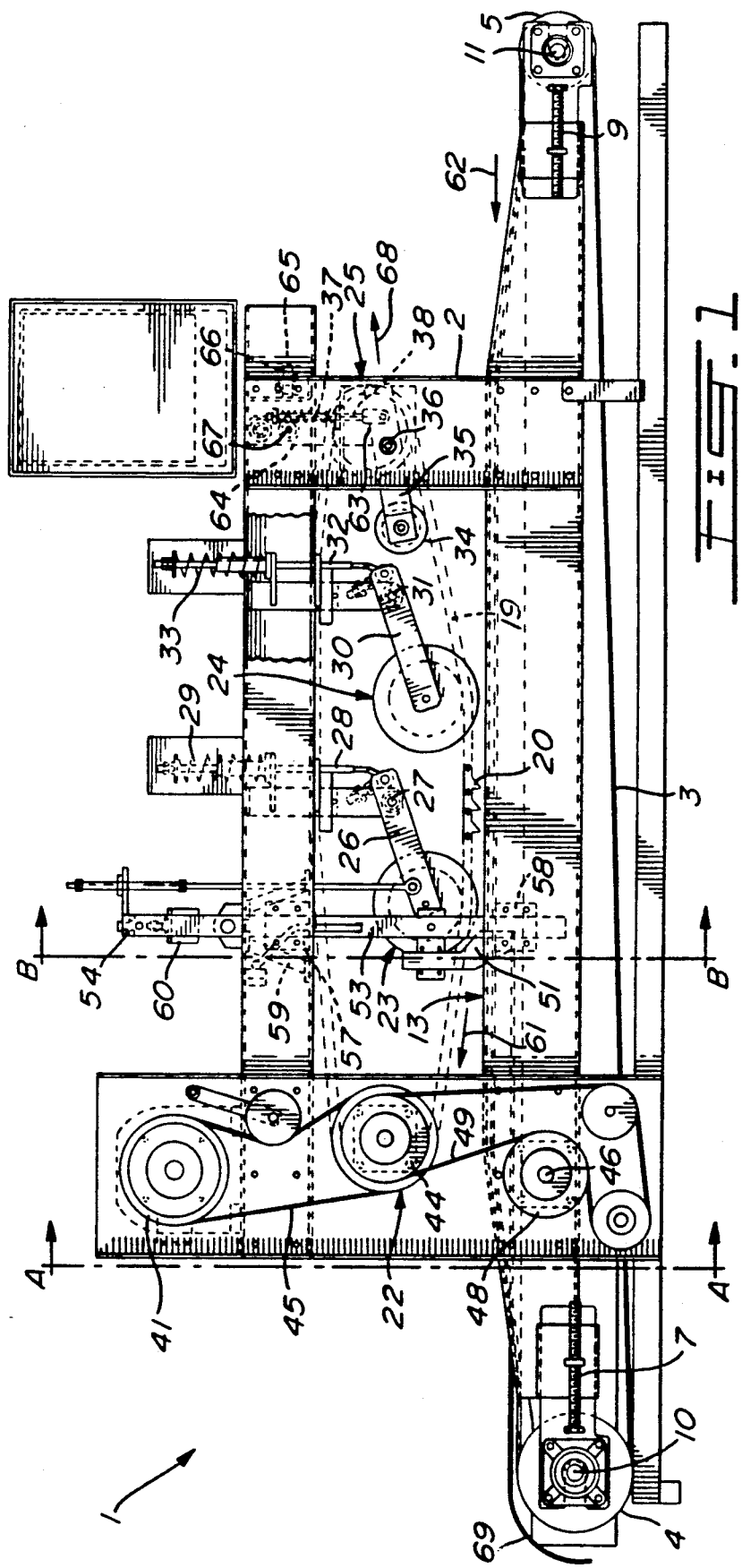
FIG. 1 is a side, elevation view of an apparatus for trimming an outer layer of fat off a piece of meat in accordance with the present invention.
Figure 2:
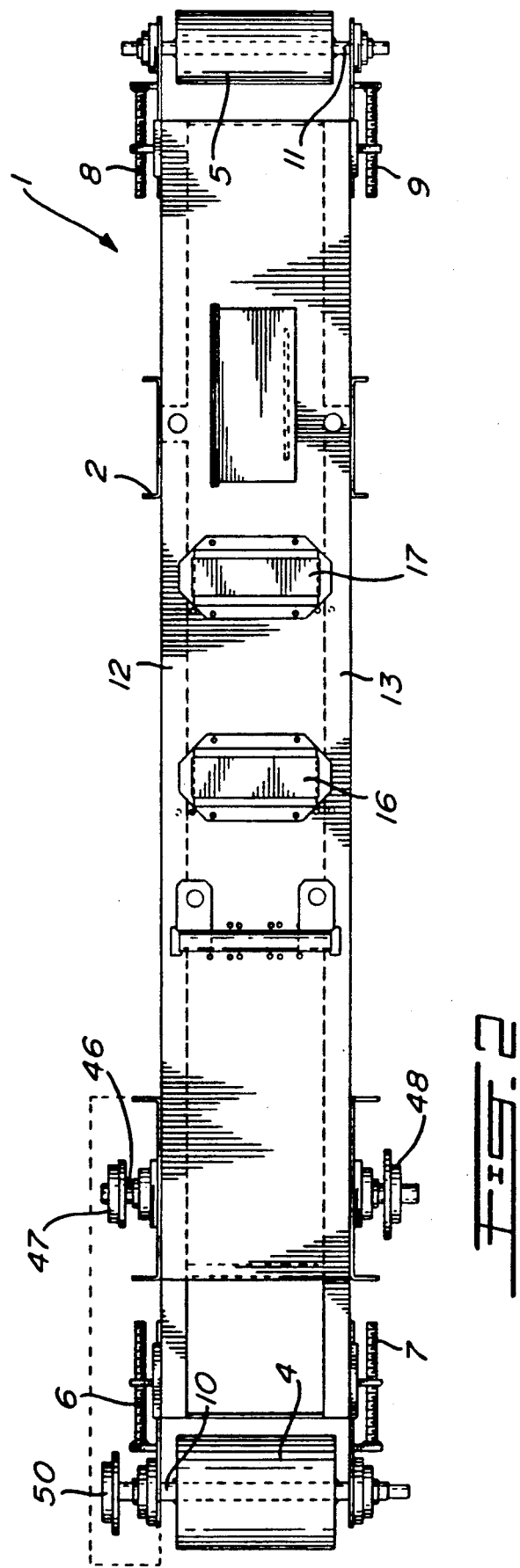
FIG. 2 is a plan view of the apparatus of FIG. 1.

The present invention will be described in detail hereinafter with reference to an apparatus for trimming back fat off a pork loin. It should however be kept in mind that the subject invention can also be applied to the processing of other types of pieces of meat.

The apparatus of the invention, generally identified by the reference numeral 1 in the appended FIGS. 1-4, comprises a frame 2 made of stainless steel. The frame 2 is of conventional construction and it is accordingly believed to be within the capacity of one skilled in the art to construct it. The frame 2 will therefore not be further elaborated in the present description.

The apparatus 1 comprises a conveyor formed of an endless belt 3 (FIG. 3) mounted on a pair of end rollers 4 and 5 (FIGS. 1 and 2) themselves rotatively mounted on the frame 2. The belt 3 is made of flexible material and defines a smooth top surface which can be manufactured for example of white neoprene. This belt 3 is tensioned by means of a first pair of threaded rod-nut assemblies 6 and 7 interposed between the shaft 10 the roller 4 and the frame 2, and by means of a second pair of threaded rod-nut assemblies 8 and 9 interposed between the shaft 11 of the roller 5 and the frame 2. Such a method of tensioning the endless belt of a conveyor is well known in the art.

Between the rollers 4 and 5, the upper section of the endless belt 3 slides on lateral surfaces 12 and 13 as well as on a belt support means 14 (FIGS. 3 and 4) arcuate in cross section. The support means 14 comprises a plurality of longitudinal bars such as 15 mounted side by side on transversal and arcuate members such as 16 and 17. The longitudinal bars 15 have their upper surface covered with slides 18 made of plastic material suitable to facilitate sliding of the belt 3. The material 18 obviously reduces attrition of the belt 3.

Figure 3:
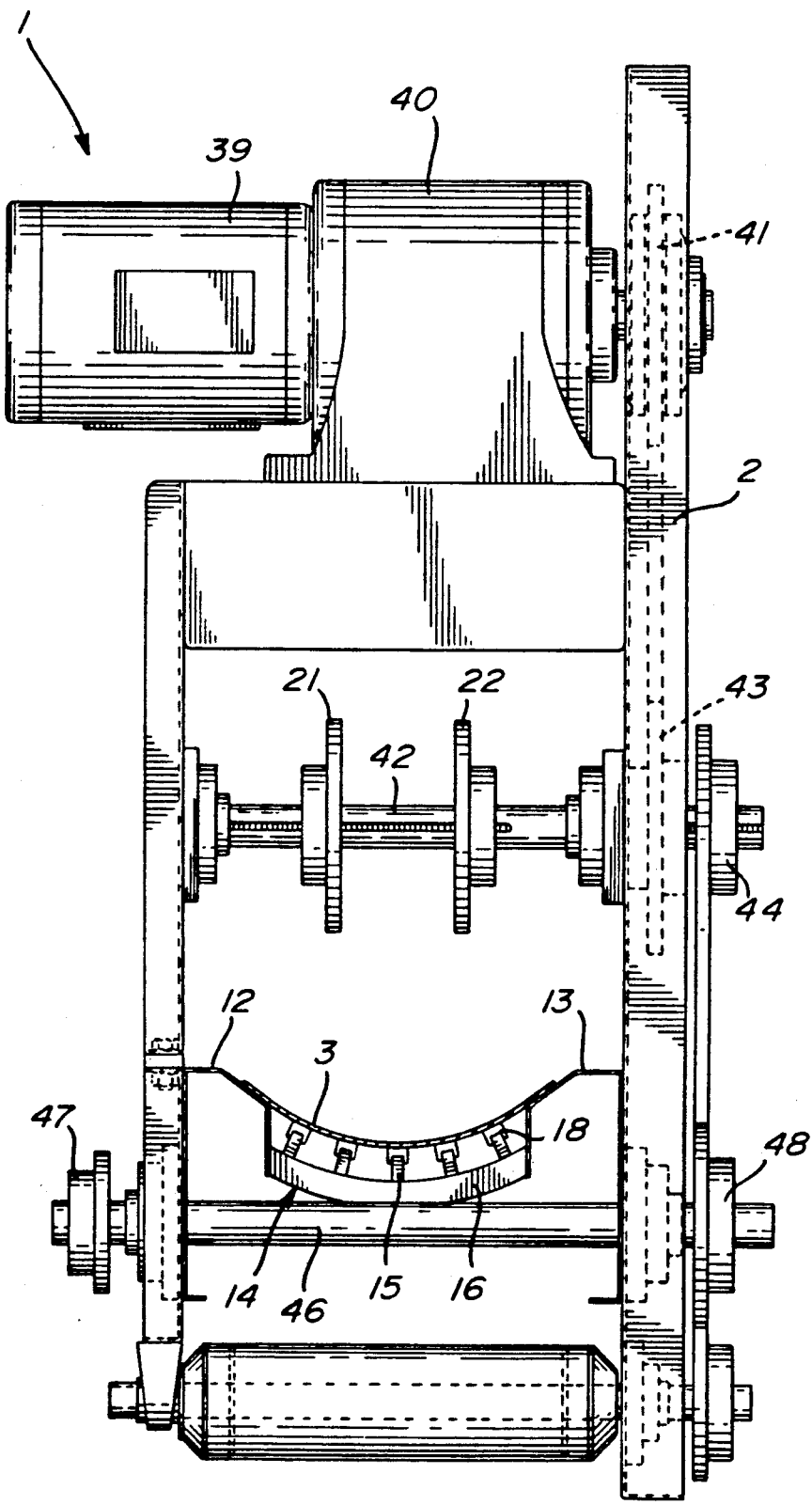
FIG. 3 is a cross sectional view of the apparatus of the invention taken along axis A—A of FIG. 1.

As can be appreciated, the belt 3 is flat in the region of the rollers 4 and 5 but is curved by the support means 14 as shown in FIG. 3 in the central region between these two rollers. In this region, the belt 3 is therefore arcuate in cross section.

A pair of endless chains such as 19 (FIG. 1) are mounted on the frame 2 above the conveyor. As illustrated in FIG. 1, the chains 19 are formed with teeth such as 20 and extend generally parallel to the belt 3. The two chains 19 are mounted at one end on respective sprocket wheels 21 and 22 (FIGS. 1 and 3), and at the other end on another pair of sprocket wheels 25 (FIG. 1). The endless chains 19 are also guided by means of two pairs of pulleys 23 and 24 disposed between the sprocket wheels 21, 22 and 25. The pair of pulleys 23 are rotatively mounted on a pair of side arms such as 26 themselves mounted on the frame 2 through pivots such as 27. The free ends of the arms 26 are pivotally fastened to a stretcher rod 28 which is pulled upwardly by means of a coil spring 29. Accordingly, the pair of pulleys 23 are urged downwardly by the coil spring 29. As shown in FIG. 1, the pair of pulleys 24 are mounted on the frame 2 through a similar mechanism including a pair of side arms such as 30, pivots such as 31, a stretcher rod 32, and a spring 33.

As illustrated in FIG. 1, the sprocket wheels 25 rotate on a shaft 63 having its two ends respectively secured to a pair of side arms such as 64 both pivotally attached to the frame 2. A stretcher rod 65 is fixed to each arm 64 through a pivot 67 and is pulled by a coil spring 66. The shaft 63 along with the sprocket wheels 25 are accordingly urged in the direction indicated by the arrow 68 to tension the chains 19.

The chains 19 are also kept tensioned by a pair of small pulleys such as 34 rotatively mounted on a pair of side arms such as 35. The arms 35 are fixed on the frame 2 through pivots such as 36 and a coil spring 37 pulls the free ends of the arms 35 upwardly through a stretcher rod 38. The pulleys 34 are thereby urged downwardly to keep the chains 19 tensioned. These pulleys 34 also produce a pressure on the pork loin as it is conveyed through the apparatus 1.

The conveyor and the chains 19 are driven by an electric motor 39 (FIG. 3) through a speed reducer 40 and a limiter clutch 41.

As shown in FIG. 3, the sprocket wheels 21 and 22 are mounted on a transversal shaft 42 itself rotatively mounted on the frame 2. Secured to one end of the shaft 42 are two other sprocket wheels 43 and 44. The clutch 41 includes a sprocket wheel to drive the pair of sprocket wheels 21 and 22 through the shaft 42, the sprocket wheel 43, and a chain 45 schematically illustrated in FIG. 1 and interconnecting the sprocket wheel 43 with that of the clutch 41. Driving of the sprocket wheels 21 and 22 of course causes driving of the two chains 19 engaged therewith in the direction 61 indicated in FIG. 1.

The apparatus 1 further comprises another transversal shaft 46 (FIGS. 1 and 3) rotatively mounted on the frame 2. Sprocket wheels 47 and 48 are respectively fixed to the two ends of this shaft 46. Another sprocket wheel 50 (FIG. 2) is also mounted on the shaft 10 of the roller 4. Rotation of the shaft 42 by the motor 39 obviously causes rotation of the sprocket wheel 44. This rotational movement is transmitted to the shaft 46 by a chain 49 interconnecting the sprocket wheels 44 and 48 as shematically illustrated in FIG. 1. The rotational movement is further transmitted from the shaft 46 to the shaft 10 through another chain (not shown) interconnecting the sprocket wheels 47 and 50. The roller 4 is therefore rotated to thereby drive the belt 3 of the conveyor in the direction 62 indicated in FIG. 1.

By appropriately selecting the diameters of the sprocket wheel of the clutch 41 and of the sprocket wheels 21, 22, 43, 44, 47, 48 and 50, the linear speed of the chains 19 and of the belt 3 can be adjusted as desired. In the present invention, the linear speed of the chains 19 is advantageously adjusted to 54 feet/minute while the linear speed of the belt 3 is adjusted to 64 feet/minute. The ratio of the linear speed of the chains to that of the conveyor is accordingly of about 0.84.

A transversal, flat cutting blade 51 is arcuate to follow the curvature in the belt 3, as illustrated in FIG. 4. It should be noted here that the curvature in the blade 51 can be selected in function of the dimensions and of the type of the pieces of meat of which the fat is to be trimmed off. The two ends of the blade 51 are secured to two vertical bars 52 and 53 of a blade support structure. The latter structure also comprises an horizontal and transversal bar 54 on the top thereof. The vertical bar 52 slides in upper and lower guides 55 and 56 both fixedly secured to the frame 2, while the vertical bar 53 slides in upper and lower guides 57 and 58 both fixedly secured to the frame 2. A transversal cylinder support bracket 59 is fixed to the frame 2 to receive the cylinder end of a vertical hydraulic cylinder 60 having its piston end secured to the transversal bar 54. Accordingly, operation of the cylinder 60 will slide the bars 52 and 53 in the guides 55-58 to raise or lower the blade support structure and thereby raise or lower the blade 51 itself.

In operation, the pork loin in placed on the top surface of the belt 3 at the upstream end thereof corresponding to the roller 5. The loin is then conveyed toward the blade 51. If the pork loin is not centered on the conveyor, the smooth top surface of the belt 3 allows the meat to slide laterally toward the center whereby the loin is adequately centered as it reaches the cutting blade. Obviously, the arcuation in the belt 3 causes such a lateral movement of the meat. As the pork loin reaches the two chains 19, the springs 29 and 33 are compressed to thereby press the loin between the chains 19 and the top surface of the belt 3. The teeth 20 then penetrate the meat. As can be appreciated by one skilled in the art, the difference in linear speed of the chains 19 and belt 3 produce in the pressed loin a compression and tension distribution which facilitates passage of the meat through the blade 51 and improves trimming of the back fat. The above mentioned speed ratio of 0.84 is particularly efficient for that purpose. The teeth 20 of the two chains 19 and the smooth top surface of the belt 3 also contribute in the obtention of the proper compression and tension distribution.

Of course, the hydraulic cylinder 60 can be operated manually or automatically to raise or lower the cutting blade 51 in function of the thickness of the back fat. As mentioned hereinabove, the top surface of the belt 3 is smooth and allows the blade 51 to be lowered very close to this top surface to thereby trim off very thin layers of back fat without loss of meat.

An arcuate sheet metal guide 69 is mounted on the frame 2 above and in front of the roller 4 as illustrated in FIG. 1. The function of this guide 69 is to separate the fat and lean portions of the loin after it has passed through the blade 51. More specifically, the trimmed back fat passes under the guide 69 while the lean portion of the loin passes over the latter guide.

Although the present invention has been described hereinabove with reference to a preferred embodiment thereof, such an embodiment can be modified at will, within the scope of the appended claims, without departing from the spirit and nature of the invention.

The embodiments of the invention in which an exclusive property of privilege is claimed are defined as follows:

1. An apparatus for trimming an outer layer of fat off a piece of meat, comprising:
   a frame;
   conveyor means mounted on the frame and defining a top surface for conveying the piece of meat;
   endless chain means also mounted on the frame above the conveyor means, the endless chain means extending generally parallel to the conveyor means;
   a cutting blade attached to the frame and positioned between the conveyor means and the endless chain means;
   means for driving the conveyor means and the chain means at different linear speeds for conveying the piece of meat toward the cutting blade and passing the piece of meat through the cutting blade to thereby trim off the fat; and
   means for pressing the piece of meat between the chain means and the top surface of the conveyor means as the piece of meat is conveyed toward the cutting blade and passes through the cutting blade;
   whereby, in operation, the different linear speeds of the conveyor means and of the endless chain means produce in the pressed piece of meat a compression and tension distribution which facilitates passage of the meat through the cutting blade to thereby improve trimming of the layer of fat.

2. A trimming apparatus as defined in claim 1, wherein the linear speed of the conveyor means is slightly higher than the linear speed of the endless chain means.

3. A trimming apparatus as defined in claim 2, in which the said top surface of the conveyor means is a smooth surface, and the said chain means comprises teeth penetrating the piece of meat of which the layer of fat is to be trimmed off.

4. A trimming apparatus as defined in claim 3, in which the ratio of the linear speed of the chain means to the linear speed of the conveyor means is of about 0.84.

5. A trimming apparatus as defined in claim 4, wherein the driving means comprises a single electric motor driving the said conveyor means and the chain means through a plurality of chains and sprockets.

6. A trimming apparatus as defined in claim 1, wherein the top surface of the conveyor means is arcuate in cross section and is smooth enough to allow the conveyed piece of meat to slide laterally onto the said top surface toward the center of the conveyor means whereby the said piece of meat is adequately positioned when it passes through the cutting blade.

7. A trimming apparatus as defined in claim 6, wherein the said conveyor means comprises an endless belt of flexible material sliding onto belt support means capable to curve the flexible material and thereby make the belt arcuate in cross section.

8. A trimming apparatus as defined in claim 3, wherein the chain means comprises at least one endless chain, and the pressing means comprises (a) at least one pulley for guiding the endless chain and (b) spring means for urging the pulley downwardly to thereby press the piece of meat between the endless chain and the top surface of the conveyor means.

9. A trimming apparatus as defined in claim 1, further comprising means for raising and lowering the cutting blade in function of the thickness of the layer of fat.

10. A trimming apparatus as defined in claim 9, wherein the top surface of the conveyor means is a smooth surface whereby the cutting blade can be lowered very close to the top surface to trim off a very thin layer of fat without loss of meat.

11. A trimming apparatus as defined in claim 1, in which the outer layer of fat of the piece of meat is the back fat of a pork loin.

12. A trimming apparatus as defined in claim 11, wherein the linear speed of the conveyor means is slightly higher than the linear speed of the endless chain means.

13. A trimming apparatus as defined in claim 12, in which the top surface of the conveyor means is a smooth surface, and the chain means comprises teeth penetrating the pork loin of which the back fat is to be trimmed off.

14. A trimming apparatus as defined in claim 13, in which the ratio of the linear speed of the chain means to the linear speed of the conveyor means is of about 0.84.

15. A trimming apparatus as defined in claim 11, wherein the top surface of the conveyor means is arcuate in cross section and is smooth enough to allow the conveyed pork loin to slide laterally onto the top surface toward the center of the conveyor means whereby the loin is adequately positioned when it passes through the cutting blade.

16. A trimming apparatus as defined in claim 15, wherein the said conveyor means comprises an endless belt of flexible material sliding onto belt support means capable to curve the said flexible material and thereby make the said belt arcuate in cross section.

* * * * *